United States Patent [19]
Schatz

[11] Patent Number: 5,558,055
[45] Date of Patent: Sep. 24, 1996

[54] METHOD AND AN ASSEMBLY FOR OPERATING SENSIBLE HEAT STORAGES

[75] Inventor: Oskar Schatz, Gauting, Germany

[73] Assignee: Schatz Thermo System GmbH, Gauting, Germany

[21] Appl. No.: 429,332

[22] Filed: Apr. 26, 1995

[30] Foreign Application Priority Data

Apr. 27, 1994 [DE] Germany ............. 44 14 791.0
Apr. 5, 1995 [DE] Germany ............. 195 12 821.4

[51] Int. Cl.⁶ .................................................. F02N 17/02
[52] U.S. Cl. .................................................. 123/142.5 R
[58] Field of Search ................. 123/142.5 R, 142.5 E

[56] References Cited

U.S. PATENT DOCUMENTS

| | | | |
|---|---|---|---|
| 3,114,360 | 12/1963 | Snelling | 123/142.5 E |
| 4,411,240 | 10/1983 | Kravetz | 123/142.5 E |
| 4,532,894 | 8/1985 | Wulf et al. | 123/142.5 E |
| 4,591,691 | 5/1986 | Badali | 123/142.5 E |
| 5,251,588 | 10/1993 | Tsujii et al. | 123/142.5 E |

FOREIGN PATENT DOCUMENTS

| | | | |
|---|---|---|---|
| 1082541 | 7/1980 | Canada | 123/142.5 E |
| 9-221464 | 12/1984 | Japan | 123/142.5 E |
| 3-253755 | 11/1991 | Japan | 123/142.5 E |
| 771353 | 10/1980 | U.S.S.R. | 123/142.5 E |

*Primary Examiner*—David A. Okonsky
*Attorney, Agent, or Firm*—Harness, Dickey & Pierce, P.L.C.

[57] ABSTRACT

In a sensible heat storage for automotive vehicles, in particular for heating the engine at cold start, the heat carrier for sensible heat between a heat source and/or heat sink and the heat storage is at the same time the storage medium and is adapted to be circulated independently of engine operation. Circulation of the heat carrier across the heat storage is initiated at the latest when the engine is started. It is continued until the whole contents of the heat storage have been replaced. Circulation of the heat carrier across the heat storage is resumed at the latest when the ignition of the engine is switched off, and it is continued until the contents of the heat storage have been completely replaced.

15 Claims, 2 Drawing Sheets

METHOD AND AN ASSEMBLY FOR OPERATING SENSIBLE HEAT STORAGES

The present invention relates to a method for operating sensible heat storages in automotive vehicles, in particular for heating the engine at cold start, using a heat carrier for sensible heat, with the heat carrier between a heat source and/or heat sink and a heat storage being at the same time the storage medium and being adapted to be circulated independently of engine operations and an assembly for performing the method.

Heat storages for heating automotive vehicles at cold start, both for heating the engine and the compartment, have become known. In the literature there have been disclosed heat storages which store the heat as conversion heat by means of latent heat storages, as well as heat storages for sensible heat using a circulating heat carrier.

A general problem in the use of heat storages within an automotive vehicle is the available space, in particular in modern vehicles wherein the space available for the technical equipment is minimal. With a view thereto latent heat storages are of advantage in that they allow for increased heat density. Furthermore they discharge heat more slowly so that they are better suited for the heating of vehicle compartments than for the heating of engines.

Heat storages for sensible heat discharge the heat within 30 to 30 sec, and accordingly they are better suited for heating vehicle engines for the purpose of reducing exhaust gas emissions. They are not quite as suited for heating the engine compartment. On the other side, heat storages for sensible heat are less expensive. Furthermore, they are more reliable in operation. The heat carrier for latent heat storages for example are agressive with respect to some metals which are present in the cooling circuit of an engine; other heat carriers are detrimental under environmental considerations and are dangerous in case of accidents. Accordingly, it is an object of the invention to improve applicability of heat sensible storages, in particular to reduce their space requirement and to improve their ability to heat vehicle compartments, i.e. to feed to the heat exchanger of the vehicle compartment heating means a heat carrier which provides for an air stream of a sufficient and agreeable temperature. For operating a sensible heat storage, in particular for heating an engine, the required volume of the heat storage is directly dependent on the total amount of heat to be stored. This heat is made up of the required usable heat and the heat losses occuring during operation. With reference to the intended purpose, for example the reduction of exhaust gas emissions, the usable heat to be transferred is dependent on the heated active masses in the engine and in the engine fluid flow circuit, on the amount of possible heat flow and the rate of discharging such heat at engine start. The heat losses which play an important role in operation of a heat storage for sensible heat depend on three parameters:

quality and volume of insulation, input and output losses of the storage, input and output losses of the engine. With the exception of the insulation all above-mentioned parameters for minimizing the required usable heat and minimizing the heat losses can be influenced by the selection of the operation mode of the vehicle, by the circuit assembly of the heat carrier flow circuit and by the structure of the heat storage, in particular by optimizing or mating these three system components in the sense that heat transfer for heating the engine at cold start is designed, as far as possible costwise and operationwise, such that the heat when the storage is unloaded is transferred to the engine at maximum rate and at the earliest possible time, and that the heat transferred from the engine to the cooling fluid is fed into the storage, stored therein and discharged therefrom at maximum efficiency.

In order to solve such problem a method as defined above is characterized in that circulation of the heat carrier across the heat storage is initiated at the latest when the engine is started and is continued until the total contents of the heat storage have been replaced, and that circulation of the heat carrier across the storage is resumed at the latest when the ignition of the engine is switched off, and is continued until the contents of the heat storage have been completely replaced.

Preferably, in such method circulation of the heat carrier across the heat storage is automatically initiated when the driver's door of the vehicle is opened. In this manner the engine and the heat exchanger is preheated before the ignition is switched on and the engine is started.

Preferably, the circulation of the heat carrier across the heat storage is resumed when a predetermined threshold temperature of the engine or of the heat carrier circulating in the engine has been reached, so that the heat storage contains hot water and the storage mass remains being heated in order to have heat from the storage available as soon as required. The threshold temperature may be about 5° to 10° C. below the thermostat temperature of the engine cooling system.

An alternative, particularly advantageous solution in a method wherein the heat carrier flows through the heat storage in the same direction when it is loaded and unloaded, consists in that the heat carrier enters the heat storage at a lowest possible location and leaves the heat storage at a highest possible location. As a result only little mixing of the inflowing cold heat carrier and the hot heat carrier in the storage will occur during cold start. The mixing of cold and hot fluids can be even more restricted if, according to a further development of the invention the heat carrier passes through a substantially horizontal sieve when it flows through the heat storage from an inlet to an outlet thereof.

In a fluid flow circuit including at least two line connections between the heat storage and the cooling fluid circuit a further advantageous embodiment of the invention provides that the direction of fluid flow during loading of the heat storage is chosen to be opposite to the direction of fluid flow during unloading of the heat storage, and that fluid flow bypasses the heat storage at operative times other than loading and unloading times. In this manner the shortest possible path for transporting the hot heat carrier can be selected both during loading and unloading of the storage, with heat losses being reduced.

For performing the method of the present invention there is provided an assembly including a combustion engine, a cooling fluid circuit extending across the engine, and a sensible heat storage, which is characterized in that the heat storage is disposed in a bypass connected in parallel to the cooling fluid circuit and adapted to be selectively operated. Preferably a switch valve for passing the cooling fluid through the bypass is disposed in the cooling fluid circuit.

A particularly advantageous embodiment of such an assembly provides that a pump for circulating the heating carrier across the heat storage is disposed in said bypass and a one-way valve preventing fluid flow opposite to the direction of fluid flow circulation is disposed in the cooling fluid circuit. This allows to spare a switch valve because the pump which is switched on only during operation of the heat storage blocks the flow path across the heat storage due to its flow resistance when it is in its rest position. A first embodiment of the flow circuit including a switch valve for selectively loading the heat storage is characterized in that the cooling fluid line comprises, in the area of the heat storage, a pair of branch lines between an upstream three-way valve and a downstream three-way valve, which branch lines are connected to each other via the heat storage, and the three-way valves have first, second and third operative positions associated with each other, the three-way valves being directly connected to each other via one of said branch lines when they are in said first position, said upstream three-way valve being connected to said first branch line and said downstream three-way valve being connected to said second branch line when said three-way valves are in said second position, and said upstream three-way valve being connected to said second branch line and the downstream three-way valve being connected to said first branch line when said three-way valves are in said third position.

An alternative embodiment is characterized in that the cooling fluid line comprises, in the area of the heat storage, a pair of parallel branch lines between an upstream junction and a downstream junction, which parallel branch lines each being adapted to be connected to the heat storage by means of a three-way valve, and the three-way valves have first, second and third operative positions associated with each other, said junctions being directly connected to each other when the three-way valves are in the first position, one port of the heat storage being connected to the upstream junction and another port of the heat storage being connected to the downstream junction when the three-way valves are in the second position, and said ports of the heat storage being connected in a sense opposite to that in the second operative position when the three-way valves are in the third position.

A further development of the present invention is characterized in that an inlet line and an outlet line between the engine and a compartment heating means is connected via a short circuit line, and either the inlet line or the outlet line is adapted to be blocked on the engine side of said short circuit line for providing a heating circuit bypassing the engine, and said heating circuit is adapted to be connected to the heat storage and includes an electric fluid flow pump.

Embodiments of the invention will now be described in more detail with reference to the accompanying drawings.

In the drawings

Figure 1:
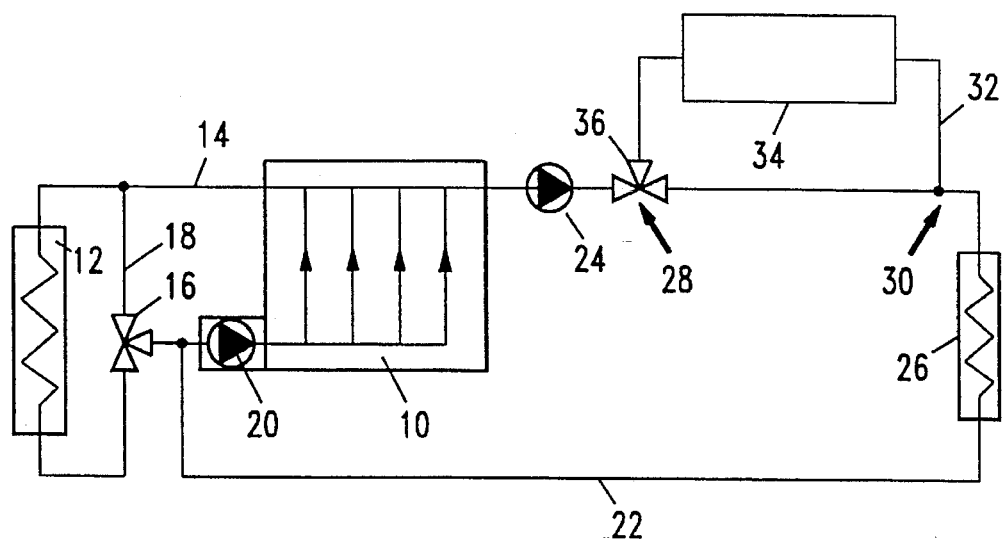
FIG. 1 shows an assembly of the cooling fluid circuit of an automotive vehicle combustion engine including a radiator, a heat exchanger and a heat storage.

The cooling fluid circuit of a combustion engine 10 as shown in FIG. 1 includes a first radiator circuit 14 extending across a radiator 12. The circuit 14 can be short circuited for bypassing the radiator 12 by means of a three-way valve 16 and a line 18 as long as the engine has not been heated up to its operative temperature. A cooling water pump 20 is provided to circulate the cooling fluid.

A second circuit, i.e. the heating circuit 22 includes an electrical pump 24 and a heating heat exchanger 26 used for heating and extends back to the cooling water pump 20. A bypass 32 which is connected to the heating circuit 22 via junctions 28 and 30 includes a heat storage 34. The junction 28 comprises, in the embodiment shown in FIG. 1, a three-way valve 36 which operates as a switch valve for having the cooling circuit extend either past the heat storage 34 or across the heat storage 34.

Figure 2:
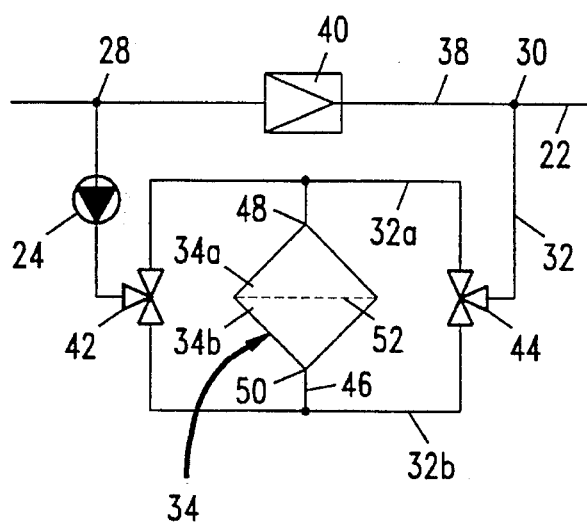
FIG. 2 shows a first embodiment for connecting the heat storage into the cooling fluid circuit of FIG. 1.
Figure 3:
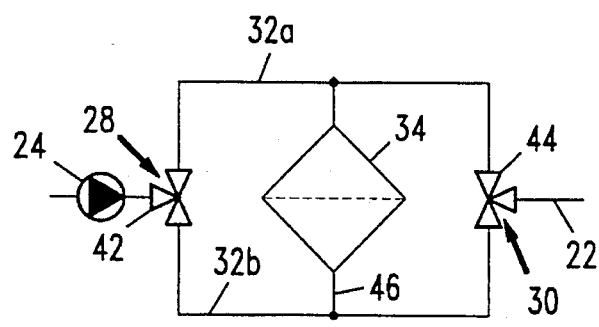
FIG. 3 shows a second embodiment for connecting the heat storage into the cooling fluid circuit of FIG. 1.

The FIG. 2 shows a first modification for connecting the heat storage 34 to the heating circuit 22, with the electrical pump 24 being arranged in the bypass 32 downstream of junction 28. A one-way valve 40 preventing backflow is connected into the direct line 38 between the two junctions 28 and 30. Between the pump 24 and the junction 30 the bypass 32 includes a pair of three-way valves 42 and 44 between which the bypass 32 is arranged to comprise a pair of parallel branches 32a and 32b. The two branches 32a and 32b of the bypass 32 are connected by a line 46 including the heat storage 34, with the arrangement being such that the heat storage 34 has a highest possible upper port 48 and a lowest possible lower port 50. The heat storage 34 is divided between its two ports 48 and 50 into an upper chamber 34a and a lower chamber 34b by at least one horizontally disposed sieve 52. The use of a horizontal sieve 52 or a plurality of horizontal sieves assists in maintaining horizontal layers between the upper hot heat carrier and the lower cold heat carrier while the heat carrier flows through the heat storage 34 so that replacement of the contents of the heat storage may occur without any significant mixing of hot and cold heat carriers. If flow of the heat carrier across the heat storage 34 is not desired, the pump 24 is inoperative thereby providing for flow resistance against fluid flow through the bypass 32 so that the fluid flows past the bypass 32 through line 38. If the heat storage 34 is to be unloaded, the three-way valves 42 and 44 are connected such that the pump 24 is connected to the branch 32b and the branch 32a is connected to junction 30. When therafter the pump 24 is operated, cold heat carrier is fed into the heat storage 34 via the lower port 50 and the hot heat carrier present in the heat storage 34 is fed via the upper port 48 towards the heat exchanger 26, with backflow of the heat carrier exiting the bypass 32 via the junction 30 into the line 38 being prevented by the one-way valve 40. If it is desired to load the heat storage 34, the three-way valves 42 and 44 are actuated such that pump 24 is connected to the branch 32a and the branch 32b is connected to the junction 30. As a result, the hot heat carrier pumped by the pump 24 is fed via the upper port 48 into the heat storage 34 so as to discharge the cooler heat carrier to be replaced via the lower port 50. The FIG. 3 shows a simplified modification wherein the three-way valves 42 and 44 replace the junctions 28 and 30, respectively. The positions of the three-way valves 42 and 44 during loading and unloading of the heat storage 34 corresponds to the respective positions described in connection with FIG. 2. If no fluid flow through the heat storage 34 is desired, the valves 42 and 44 will be connected directly to each other, for example via the branch 32a.

Figure 4:
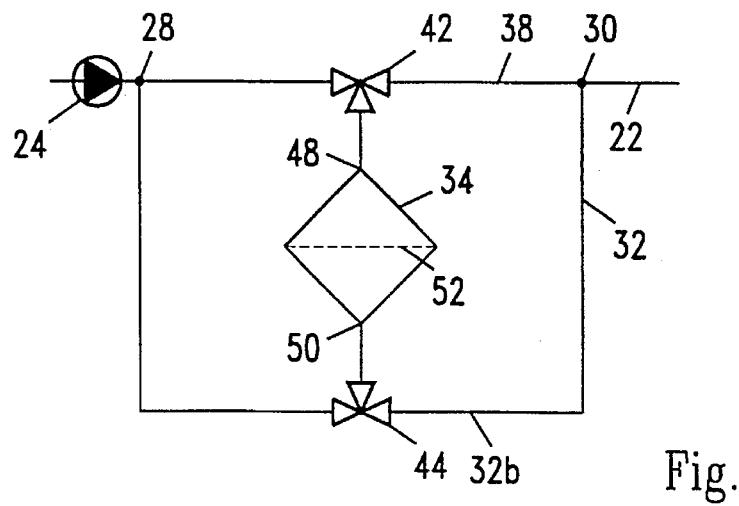
FIG. 4 is a third embodiment for connecting the heat storage into the cooling fluid circuit of FIG. 1.

FIG. 4 shows an alternative embodiment which differs from the embodiment of FIG. 3 substantially in that the three-way valves 42 and 44 are not disposed at the junctions 28 and 30, but are arranged directly upstream of the two ports 48 and 50 of the heat storage 34. In this connection the three-way valve 42 is disposed in the line 38 between the junctions 28 and 30 and has three positions. When the three-way valve 42 is in the first position, it connects directly the junctions 28 and 30 to each other such that the fluid flow bypasses the heat storage. When the valve is in the second position, it connects the junction 28 with the upper port 48 of the heat storage; when the three-way valve 42 is in this position, the three-way valve 44 is set such that it connects the lower port 50 of the heat storage 34 with the line junction 30. As a result, the heat storage 34 is being loaded by hot heat carrier.

When the three-way valve 42 is in the third position, it connects the upper port 48 of the heat storage 34 with the junction 30, while the three-way valve 44 connects the lower port 50 of the heat storage 34 with the junction 28. As a result the heat storage 34 is being unloaded.

Figure 5:
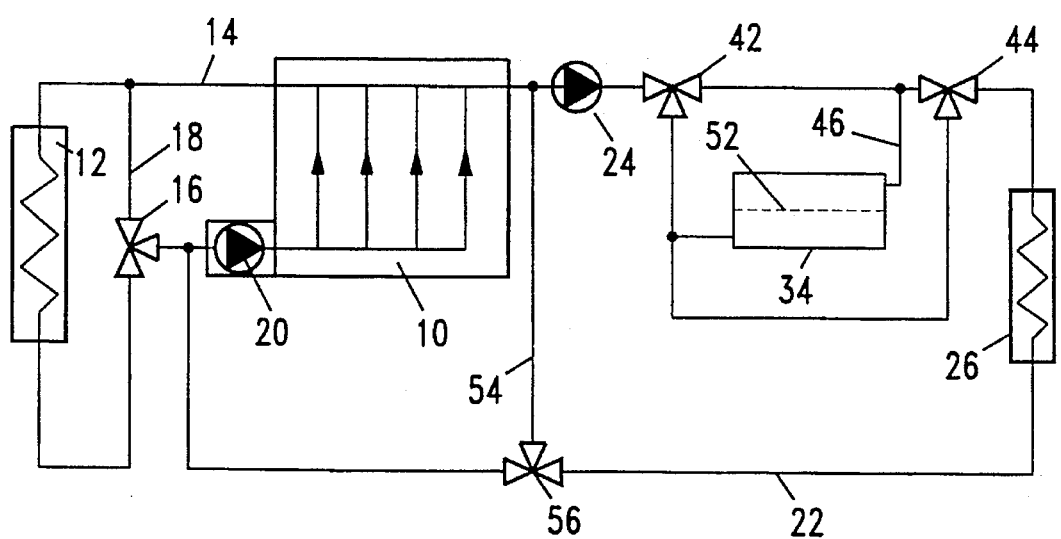
FIG. 5 is a modification of the cooling fluid circuit of FIGS. 1 and 3 including a short circuit line.

FIG. 5 shows, in a manner corresponding to that of FIG. 1, the complete cooling fluid circuit with the use of the embodiment as shown in FIG. 3. Contrary to the arrangement of FIG. 1 the embodiment of FIG. 5 includes a short circuit line 54 in the heating circuit 22 bypassing the engine 10. The line 54 is adapted to connect the area downstream of the heat exchanger 26 with the area downstream of the electrical pump 24 via a three-way valve 46 such that the heating circuit 22 can be operated independently of the cooling circuit of the engine.

I claim:

1. A method for operating sensible heating storages in automotive vehicles, in particular for heating an engine at cold start, comprising the steps of:

using a heat carrier for sensible heat, with the heat carrier circulating between the engine, which is a heat source when hot and a heat sink when cold, and a heat storage the heat carrier being adapted to be circulated independently of engine operation;

initiating circulation of the heat carrier to the heat storage at the latest when the engine is started;

continuing circulation of the heat carrier until the total contents of the heat storage has been replaced;

resuming circulation of the heat carrier to the heat storage at the latest when an ignition of the engine is switched off; and continuing circulation of the heat carrier until the contents of the heat storage has been completely replaced.

2. A method as defined in claim 1, wherein circulation of the heat carrier to the heat storage is automatically initiated when a driver's door of the vehicle is opened.

3. A method as defined in claim 1, wherein circulation of the heat carrier to the heat storage is resumed when a predetermined threshold temperature of the engine or of the heat carrier circulating in the engine has been reached.

4. A method as defined in claim 3, wherein said threshold temperature is about 5° to 10° C. below thermostat temperature of an engine cooling system.

5. A method for operating a sensible heat storage as defined in claim 1, wherein the heat carrier flows through the heat storage during loading and unloading thereof in the same direction, characterized in that the heat carrier enters the heat storage at a lowest possible location and leaves the heat storage at a highest possible location.

6. A method as defined in claim 1, wherein the heat carrier passes through a substantially horizontal sieve when it flows through the heat storage from an inlet to an outlet thereof.

7. A sensible heat storage assembly in an automotive vehicle for heating an engine at cold start, comprising;

a heat carrier for sensible heat which circulates between the engine, which is a heat source when hot and a heat sink when cold, and a heat storage, the heat carrier being adapted to be circulated independently of engine operation;

a fluid flow circuit having at least two line connections between the heat storage and a cooling fluid circuit;

circulation of the heat carrier to the heat storage is initiated at the latest when the engine is started and is continued until the total contents of the heat storage has been replaced, circulation of the heat carrier to the heat storage is resumed at the latest when an ignition of the engine is switched off and is continued until the contents of the heat storage has been completely replaced, wherein the direction of fluid flow during loading of the heat storage is chosen to be opposite to the direction of fluid flow during unloading of the heat storage, and that fluid flow bypasses the heat storage at operative times other than loading and unloading times.

8. A sensible heat storage assembly in an automotive vehicle for heating a combustion engine at cold start, comprising:

a cooling fluid circuit extending to the engine; and a sensible heat storage that disposed in a bypass connected in parallel to a cooling fluid circuit and adapted to be selectively operated; and a heat carrier circulating between the engine, which is a heat source when hot and a heat sink when cold, and the heat storage, the heat carrier being adapted to be circulated independently of engine operation, circulation of the heat carrier to the heat storage is initiated at the latest when the engine started and is continued until the total contents of the heat storage has been replaced, circulation of the heat carrier to the heat storage is resumed at the latest when an ignition of the engine is switched off and is continued until the contents of the heat storage has been completely replaced.

9. As assembly as defined in claim 8, wherein a switch valve for having the cooling fluid flow through the bypass is disposed in the cooling fluid circuit.

10. An assembly as defined in claim 8, wherein a pump for circulating the heating carrier to the heat storage is disposed in said bypass and a one-way valve preventing fluid flow opposite to the direction of fluid flow circulation is disposed in the cooling fluid circuit.

11. An assembly as defined in claim 7, wherein the cooling fluid circuit comprises, in the area of the heat storage, a pair of branch lines between an upstream three-way valve and a downstream three-way valve, which branch lines are connected to each other via the heat storage, and the three-way valves have first, second and third operative positions associated with each other, the three-way valves being directly connected to each other via one of said branch lines when they are in said first position, said upstream three-way valve being connected to said first branch line and said downstream three-way valve being connected to said second branch line when said three-way valves are in said second position, and said upstream three-way valve being connected to said second branch line and the downstream three-way valve being connected to said first branch line when said three-way valves are in said third position.

12. An assembly as defined in claim 7, wherein the cooling fluid circuit comprises, in the area of the heat storage, a pair of parallel branch lines between an upstream junction and a downstream junction, which parallel branch lines each being adapted to be connected to the heat storage by means of a three-way valve, and the three-way valves have first, second and third operative positions associated with each other said junctions being directly connected to each other, when the three-way valves are in the first position, one port of the heat storage being connected to the upstream junction and another port of the heat storage being connected to the downstream junction when the three-way valves are in the second position, and said ports of the heat storage being connected in a sense opposite to that in the second operative position when the three-way valves are in the third position.

13. An assembly as defined in claim 8, wherein an inlet line and an outlet line between the engine and a compartment heating means for heating a compartment of the vehicle are connected via a short circuit line, and either the inlet line or the outlet line is adapted to be blocked on an engine side of said short circuit line for providing a heating circuit bypassing the engine, and said heating circuit is adapted to be connected to the heat storage and includes an electric fluid flow pump.

14. An assembly as defined in claim 7, wherein an inlet through which the heat carrier enters the heat storage is disposed at a lowest possible location of the heat storage and an outlet through which the heat carrier leaves the heat storage is disposed at a highest possible location of the heat storage.

15. An assembly as defined in claim 14, wherein at least one sieve which is horizontal in an operative position of the heat storage is disposed between said inlet and outlet.

* * * * *